(12) United States Patent
Rabovitser et al.

(10) Patent No.: US 7,758,663 B2
(45) Date of Patent: *Jul. 20, 2010

(54) PLASMA ASSISTED CONVERSION OF CARBONACEOUS MATERIALS INTO SYNTHESIS GAS

(75) Inventors: Iosif K. Rabovitser, Skokie, IL (US);
Serguei Nester, Elk Grove Village, IL (US); Bruce Bryan, Wilmette, IL (US)

(73) Assignee: Gas Technology Institute, Des Plaines, IL (US)

( * ) Notice: Subject to any disclaimer, the term of this patent is extended or adjusted under 35 U.S.C. 154(b) by 1137 days.

This patent is subject to a terminal disclaimer.

(21) Appl. No.: 11/353,723

(22) Filed: Feb. 14, 2006

(65) Prior Publication Data

US 2007/0186472 A1    Aug. 16, 2007

(51) Int. Cl.
*C01B 3/36*      (2006.01)
*C10J 3/46*      (2006.01)
*C10J 3/54*      (2006.01)
*C10J 3/16*      (2006.01)
*C10K 3/06*      (2006.01)
*H05F 3/00*      (2006.01)
*B01J 12/00*     (2006.01)

(52) U.S. Cl. .................. 48/197 R; 48/202; 48/209; 48/210; 204/164; 204/170

(58) Field of Classification Search ............ 48/197 R, 48/61, 202, 209, 210; 204/164, 170
See application file for complete search history.

(56) References Cited

U.S. PATENT DOCUMENTS

| | | | |
|---|---|---|---|
| 3,891,403 A | 6/1975 | Weil et al. | |
| 4,057,402 A | 11/1977 | Patel et al. | |
| 4,095,960 A * | 6/1978 | Schuhmann, Jr. ......... | 48/197 R |
| 4,352,044 A | 9/1982 | Zhukov et al. | |
| 4,369,045 A | 1/1983 | Vorres | |
| 4,552,076 A * | 11/1985 | McCartney .................. | 110/347 |
| 4,592,762 A | 6/1986 | Babu et al. | |
| 4,699,632 A | 10/1987 | Babu et al. | |
| 5,092,984 A | 3/1992 | Babu et al. | |
| 5,795,484 A * | 8/1998 | Greenwald, Sr. ............ | 210/696 |

(Continued)

FOREIGN PATENT DOCUMENTS

WO    WO 0013786 A1 *  3/2000

OTHER PUBLICATIONS

Heberlein, J.V.R., "Generation of Thermal and Pseudo-Thermal Plasmas", *Pure & Appl. Chem.*, vol. 64, No. 5, pp. 629-636, 1992.

*Primary Examiner*—Alexa D Neckel
*Assistant Examiner*—Matthew J Merkling
(74) *Attorney, Agent, or Firm*—Mark E. Fejer

(57) ABSTRACT

A method and system for producing synthesis gas in which a carbonaceous material and at least one oxygen carrier are introduced into a non-thermal plasma reactor at a temperature in the range of about 300° C. to about 700° C. and a pressure in a range of about atmospheric to about 70 atmospheres and a non-thermal plasma discharge is generated within the non-thermal plasma reactor. The carbonaceous material and the oxygen carrier are exposed to the non-thermal plasma discharge, resulting in the formation of a synthesis gas in the non-thermal plasma reactor.

14 Claims, 11 Drawing Sheets

U.S. PATENT DOCUMENTS

| | | | |
|---|---|---|---|
| 5,993,761 A * | 11/1999 | Czernichowski et al. | 423/210 |
| 6,146,599 A | 11/2000 | Ruan et al. | |
| 6,326,407 B1 | 12/2001 | Eliasson et al. | |
| 6,375,832 B1 | 4/2002 | Eliasson et al. | |
| 6,884,326 B2 | 4/2005 | Futamura et al. | |
| 6,896,854 B2 | 5/2005 | Kong et al. | |
| 6,923,890 B2 | 8/2005 | Ricatto et al. | |
| 2002/0068768 A1 * | 6/2002 | Wallace et al. | 518/728 |
| 2003/0084613 A1 | 5/2003 | Futamura et al. | |
| 2003/0183080 A1 * | 10/2003 | Mundschau | 95/55 |
| 2003/0192235 A1 * | 10/2003 | French et al. | 44/572 |
| 2005/0000163 A1 * | 1/2005 | Dalton | 48/197 FM |
| 2007/0007257 A1 * | 1/2007 | Uhm et al. | 219/121.48 |

* cited by examiner

Reactant Flow →

PLASMA ASSISTED CONVERSION OF CARBONACEOUS MATERIALS INTO SYNTHESIS GAS

BACKGROUND OF THE INVENTION

1. Field of the Invention

This invention relates to the conversion of carbonaceous materials into synthesis gas. This invention relates to a method and system for conversion of carbonaceous materials into synthesis gas. More particularly, this invention relates to low temperature gasification of carbonaceous materials to produce synthesis gas. More particularly yet, this invention relates to low temperature gasification of carbonaceous materials using a low temperature Plasma Assisted Reforming (PAR) process for the co-production of hydrogen-enriched fuel gas, chemicals and electricity as an alternative to high temperature thermal gasification. This invention further relates to a method and system for conversion of carbonaceous materials to synthesis gas using non-thermal plasma reactors.

2. Description of Related Art

Methods and systems for gasification of carbonaceous materials to produce synthesis gas are well known. See, for example, U.S. Pat. Nos. 4,057,402, 4,369,045, and 5,092,984, all of which are directed to coal gasification; U.S. Pat. No. 3,891,403 directed to gasification of oil shale; and U.S. Pat. Nos. 4,699,632 and 4,592,762 directed to gasification of biomass. Indeed, gasification of coal is one of the oldest methods for producing hydrogen. In conventional gasification processes, the coal to be converted is heated up to about 900° C., at which temperature it turns into a gaseous form, after which it is mixed with steam and fed over, or otherwise brought into contact with, a catalyst.

A plasma is a collection of ions, electrons, charge-neutral gas molecules, and other species in varying degrees of excitation resulting from the separation of gas component molecules of a gas to which a specific amount of energy has been added. Depending on the amount of energy added, the plasma can be characterized as thermal or non-thermal. In a thermal plasma, enough energy is introduced so that the plasma constituents are in thermal equilibrium—the ions and electrons are, on average, at the same temperature. Exemplary of a thermal plasma generator is an electric arc, of which a lightning bolt bridging the gap between a storm cloud and the earth is a familiar manifestation. The temperature of thermal plasma components is about 1-2 electron-volts (1 eV corresponds to about 11,600° K.). A non-thermal plasma is one in which the mean electron energy, or temperature, is considerably higher than that of the bulk-gas molecules. Because energy is added to the electrons instead of the ions and background gas molecules, the electrons can attain energies in the range of about 1-10 eV, while the background gas remains at ambient temperature. This non-thermal condition can be created at atmospheric, sub-atmospheric and super-atmospheric pressures. Exemplary of a non-thermal plasma generator is a dielectric barrier discharge.

The use of electrical discharge, i.e. plasma, to initiate chemical reactions of interest is also known and has been in use for a long time. For example, U.S. Pat. No. 4,352,044 teaches a plasma generator in which a mixture of a gaseous oxidizing agent, such as steam and oxygen, and a pulverized solid fuel is supplied directly into a zone in which an electric discharge produced by a DC and AC source is sustained for the purpose of gasifying the pulverized solid fuel. The plasma generator comprises a discharge chamber provided with means for introducing a plasma-forming medium and associated with a cathode assembly and an anode assembly, the latter of which includes at least two plasmatrons, each having a hole for an inlet for the plasma-forming medium and being provided with an end electrode and an auxiliary hollow electrode. These electrodes are connected to an arc discharge initiating system. The exit openings of the auxiliary electrodes communicate with the discharge chamber and are evenly distributed along the perimeter of its cross section. The cathode assembly also comprises at least two plasmatrons, each having a hole for an inlet for the plasma-forming medium and being provided with an end electrode and an auxiliary hollow electrode, each of which is connected to an arc discharge initiating system.

U.S. Pat. No. 6,923,890 B2 teaches a method for activating chemical reactions using a non-thermal capillary discharge plasma unit or a non-thermal slot discharge plasma unit.

A dielectric barrier discharge (DBD) is a gas discharge (a non-thermal plasma) between two electrodes separated by one or more dielectric layers and a gas-filled gap. When a high voltage is applied to the electrodes, the electric field in the gap ionizes the gas. The ions and electrons produced by this electric discharge are attracted towards the electrodes of opposite polarity and form a charge layer on the dielectric surface. These charges cancel the charge on the electrodes so that the electric field in the gap falls to zero and the discharge stops. U.S. Pat. No. 6,326,407 B1 and U.S. Pat. No. 6,375,832 B1 teach a method of transforming a normally gaseous composition of methane into a material comprising a major portion of hydrocarbons containing at least two carbon atoms using a dielectric barrier discharge; U.S. Pat. No. 6,896,854 B2 teaches a reactor for reactive co-conversion of heavy hydrocarbons and hydrocarbon gases to lighter hydrocarbon materials which includes a dielectric barrier discharge plasma cell; and U.S. Pat. No. 6,146,599 teaches a dielectric barrier discharge system having first and second non-thermal plasma reactors coupled together in series, which system is indicated to be used to decompose hazardous compounds in a liquid or a gas, such as in power plant flue gases.

In catalytic gasification of coal, simultaneous use of an external heat supply and catalytic promotion of the reaction is employed to reduce the gasification temperature. Catalytic gasification of coal has thermal characteristics similar to the catalytic steam reforming of natural gas. Coal contains significant amounts of inorganic matter (ash), primarily Si, Al, Fe, Ca, Mg, Na, K and Ti oxides. Some of those components (K, Na, Fe, and Ca) have been reported to be catalysts in solid fuel conversion reactions. To realize this catalytic effect, the coal surface must be continuously activated by thermal or chemical treatment. Studies have shown that a catalyst could decrease coal gasification reaction temperatures to 700° C. The idea of using plasma for coal surface activation at the process temperature typical of catalytic gasification originates from these studies.

Low pressure cold plasma studies have shown increases in coal reactivity, but at near room temperature. Gasification of solid fuels at near-room temperature was studied in 2.45 GHz low-pressure (600-3000 Pa) microwave discharges in batch and continuous flow reactors at temperatures up to 100° C. The main reaction products were $H_2$, CO, $CO_2$, $CH_4$ and $C_2H_6$, with $H_2$ and CO being the most abundant. The addition of water vapor increased the syngas output.

Several groups have also studied coal conversion in a glow discharge plasma. Plasma treatment of bituminous coal (60 Hz, 26 kV, 2.6 mA) yielded $H_2$ and CO, with trace amounts of $CH_4$. Electronic Spin Resonance (ESR) data showed a 2,5-fold increase in spin concentration ($10^{18}$ spins/g) indicating a radical reaction mechanism. Gasification of anthracite by $CO_2$ in direct current (100 mA) glow discharge plasma at 5,340 Pa pressure was also studied. These studies show that plasma species activate the coal surface and initiate surface reactions of coal conversion at near room temperature. Plasma discharges in $H_2O$ and $CO_2$ convert coal into syngas. In a hydrogen-rich environment, the plasma discharges produce methane and higher hydrocarbons.

In atmospheric pressure cold plasma studies, increases in reactivity were shown, but at temperature levels below those of the invention described herein below. Two groups have evaluated gasification in non-thermal plasmas at atmospheric pressure and process temperatures up to 350° C., wherein the coal was gasified using a corona discharge in hydrogen. The temperature was varied between 100° C. and 350° C. The results showed a similar yield as for thermal decomposition, except that no tar was produced. Another study of gasification of tars in pulsed corona discharges in $H_2O$, $CO_2$ and $H_2$ at temperatures up to 200° C. has also been reported. The results show the feasibility of tar gasification at 200° C. and that $H_2O$ was the most effective agent for tar decomposition, followed by $CO_2$ and $H_2$.

SUMMARY OF THE INVENTION

It is one object of this invention to provide a method and system for low temperature gasification of carbonaceous materials for co-production of hydrogen-enriched fuel gas, chemicals and electricity from said carbonaceous materials as an alternative to high temperature thermal gasification.

This and other objects of this invention are addressed by a method and system for producing synthesis gas in which a carbonaceous material and an oxygen carrier are introduced into a plasma reaction zone of a non-thermal plasma reactor at a temperature in a range of about 300° C. to about 700° C. and a non-thermal plasma discharge is generated within the plasma reaction zone. The carbonaceous material and the oxygen carrier are exposed to the non-thermal plasma discharge, resulting in the formation of a synthesis gas in the plasma reaction zone. In accordance with one preferred embodiment of this invention, pressure within the non-thermal plasma reactor is in the range from about atmospheric to about 70 atmospheres.

The method and system of this invention provide technical advantages over conventional high temperature gasification, improve economics, and increase efficiency due to process specific energy and fuel savings resulting from a) process temperatures below 700° C. across the entire PAR gasification plant, b) 30% more $H_2$ produced per pound of coal as compared to traditional air/oxygen blown gasification, c) no direct coal burn in the gasifier, d) a product gas high in hydrogen and $CO_2$, simplifying purification requirements and $CO_2$ capture, e) elimination of high temperature rated equipment, hot gas clean up, and water shift reactor, f) high energy efficiency—62% High Heating Value (HHV) of coal for co-production of hydrogen and electricity at a hydrogen-to-electricity ratio of 3:1, g) possibility of modular design and market applicability for large industrial users (steel, glass, forest and paper, oil refinery, and food), h) application of DBD technology similar to that currently used for ozone generation for water purification technology available at up to 30 Mwe, and I) low temperature plasma estimated to require only 2-3% of coal thermal input.

BRIEF DESCRIPTION OF THE DRAWINGS

These and other objects and features of this invention will be better understood from the following detailed description taken in conjunction with the drawings wherein:

FIG. 5($b$) is a diagram showing energy cost of the PAR process under conditions of absolute quenching and ideal quenching (A, eV);

DETAILED DESCRIPTION OF THE PRESENTLY PREFERRED EMBODIMENTS

Definitions

As used herein, the term "low temperature" refers to temperatures up to about 700° C.

As used herein, the term "carbonaceous material" refers to any solid, liquid or gaseous carbon-containing material suitable for use as a fuel, i.e. a material which can be consumed to produce energy. Included within the scope of this term are fossil fuels, including coal, oil, natural gas, and oil shale, biomass, i.e. plant materials and animal wastes used as fuel, coke, char, tars, wood waste, methanol, ethanol, propanol, propane, butane, ethane, etc.

As used herein, the term "oxygen carrier" refers to any oxygen-containing substance which gives up its oxygen during a gasification process to produce a gasification product comprising synthesis gas and/or hydrocarbons. Included within the scope of this term are $H_2O$, $CO_2$, steam and mixtures thereof.

Figure 1:
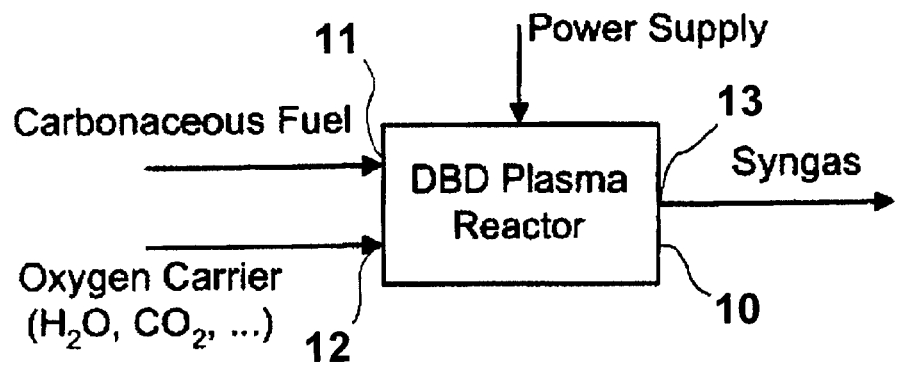
FIG. 1 is a schematic diagram showing a process for plasma assisted reforming of carbonaceous fuel in accordance with one embodiment of this invention.

The basic component of the method and system of this invention, shown in FIG. 1, is a plasma assisted reforming (PAR) reactor 10 operably connected with a power supply and having a carbonaceous material inlet 11, an oxygen carrier inlet 12 and a product gas outlet 13. Although separately introducible into the PAR reactor, in accordance with one preferred embodiment of this invention, the carbonaceous material and at least one oxygen carrier are preheated to a temperature of at least about 300° C. and introduced into the PAR reactor as a mixture. Although any non-thermal plasma reactor, such as a corona discharge or electron beam, may be employed in the method and system of this invention, the preferred non-thermal plasma reactor is a dielectric barrier discharge (DBD) plasma reactor. In operation, the DBD plasma is applied to the fuel/oxygen carrier mixture disposed within the plasma reaction zone of the DBD plasma reactor for at least about one (1) second with a discharge voltage amplitude (AC or pulsed) above about 1 kV.

Non-thermal plasma (such as DBD plasma) promotes reforming of coal at a given temperature by using the catalytic properties of the coal surface in conjunction with continuous surface activation through treatment by plasma species (electrons, ions, radicals, and excited species). In the DBD reactor, the reactants are placed between a high voltage electrode and a ground electrode. DBD treatment forms reaction precursors on the coal surface through what is believed to be one or more of the following potential mechanisms of plasma initiation:

1. Increases in the number of active sites on the coal surface by plasma particles bombardment
2. Decreases of the process activation energy due to local electric field at the length scale smaller than Debye radius through (i) charging of the coal particle with positive and negative electric charges embedded in the surface, including charge entrapment in the pores; (ii) interaction of gas phase ions and electrons with the surface; and (iii) polarization of the coal particle in the external electric field
3. Processes of electron-ion recombination on the surface
4. Catalytic processes on metallic atoms present in coal ash
5. Surface reactions with large organic molecules activated by plasma during devolatilization Another important role of the DBD plasma reactor is to convert tars and oils, the presence of which is an operational issue for low-temperature gasification due to wall deposition, into $CO_2$ and hydrogen. The choice and merit of DBD plasma as a surface activation agent is based on low electrical power consumption (<2-5% of coal heat input on an HHV basis) by the DBD plasma reactor, commercial availability of efficient low-cost power supplies, and broad experience base with DBD plasma in various applications (e.g. for ozone generation, surface treatment, and pollution control).

Figure 3:
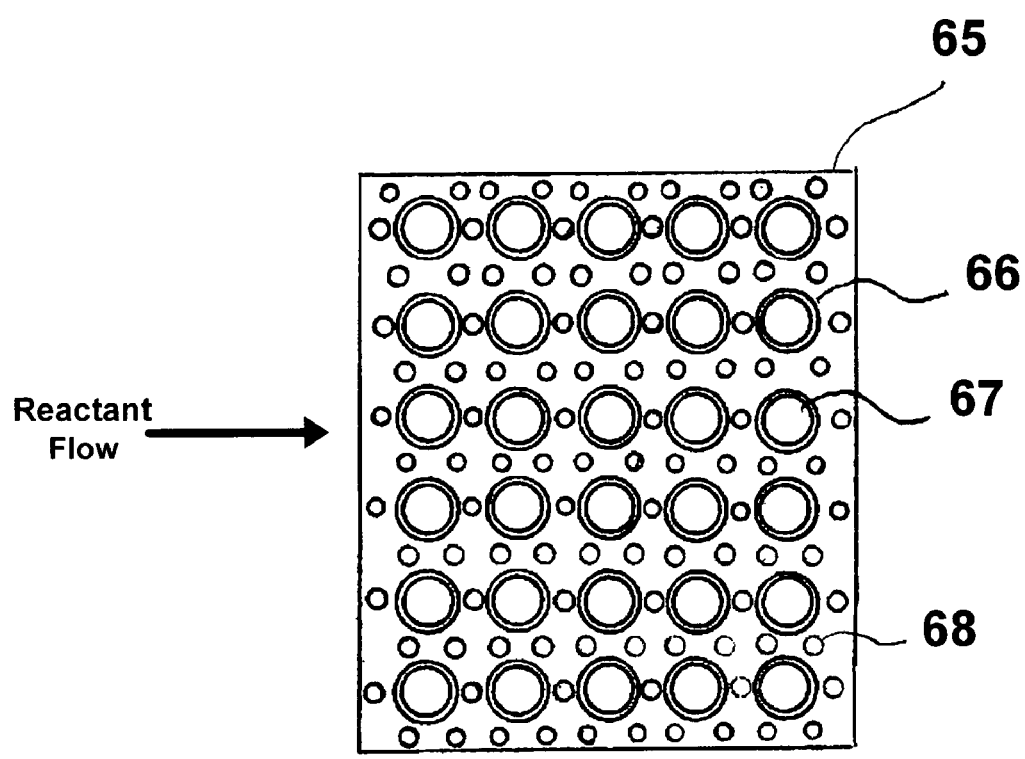
FIG. 3 is an end view of an entrained flow DBD reactor in accordance with one embodiment of this invention.

The reactor in accordance with one embodiment of this invention as shown in FIG. 3 comprises a rectangular stainless steel duct 65 with a plurality of quartz tubes 66 containing high-voltage electrodes 67. Each tube 66 is surrounded by a plurality of grounded stainless steel rods 68, forming a discharge cell with a dielectric (quartz) barrier and a discharge gap. This arrangement provides uniform distribution of the discharge over the reactor volume. Power supplies for DBD plasma may be operated in AC and/or pulsed mode. The DBD plasma reactor may be operated at elevated temperatures up to 750° C.

Figure 2:
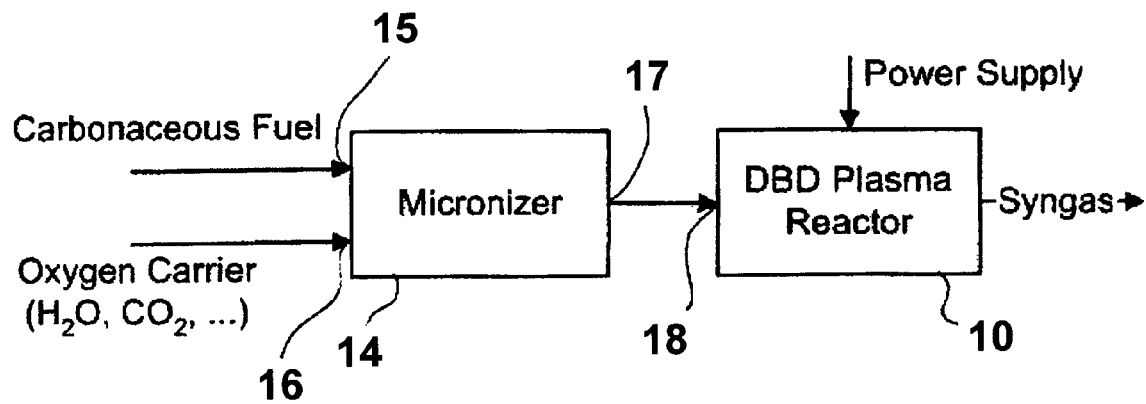
FIG. 2 is a schematic diagram showing a process for plasma assisted reforming of carbonaceous fuel with micronizer in accordance with one embodiment of this invention.

In accordance with one preferred embodiment of this invention, as shown in FIG. 2, the system of this invention further comprises micronizer mill 14 disposed upstream of DBD plasma reactor 10 having a carbonaceous material mill inlet 15, an oxygen carrier mill inlet 16, and a carbonaceous material/oxygen carrier mixture outlet 17 in fluid communication with a carbonaceous material/oxygen carrier mixture (reactants) inlet 18 of DBD plasma reactor 10. In accordance with one embodiment of this invention, the micronizer mill is a jet mill. Such jet mills are known to those skilled in the art and are commercially available. As previously suggested, the oxygen carrier is used as a grinding and/or drying agent as well as a fine solids carrier within the micronizer mill. The at least one solid carbonaceous material is micronized in accordance with one preferred embodiment to an average particle size of less than or equal to about 20 microns, producing a mixture of micronized particles and oxygen carrier, which mixture, in accordance with one embodiment of this invention, is preheated to a temperature of at least about 300° C. prior to introduction into the DBD plasma reactor.

As previously indicated, the preferred average particle size for coal (or other solid carbonaceous fuel) particles is less than or equal to about 20 microns, which provides a large total reactive surface area of solid reactant. Large coal surface areas ($m^2$/kg) are necessary for the PAR process, which utilizes the catalytic properties of coal mineral matter and continuous plasma activation of the reaction surface. Steam-based (or $CO_2$-based) coal micronization increases the available coal surface area. By using steam (or other appropriate gaseous reactant) as a grinding technology for the PAR process, the steam is utilized twice: first, as a grinding agent, and, second, as a chemical reactant for coal gasification. Steam is readily available in the power plant, and use of steam supports integration of the PAR process module into the power plant. A jet mill employing steam also has process specific advantages over other kinds of mills. The jet mill can grind coal to below 10 microns average particle size and classify it in a very narrow particle size range at the same time. There are no moving parts to wear out or generate heat in a jet mill, no screens to plug or be punctured, and no attritional heat. Well designed, high-speed mechanical mills also can grind coal into the low micron size range, but wear, product contamination and attritional heat are all problematic.

In the PAR process of this invention, a reactant mixture comprising coal (or other solid carbonaceous fuel such as biomass, wood waste, petcoke, oil shale, etc.) and steam (or steam with admixtures of oxygen and/or hydrogen carriers) is exposed to low temperature plasma at a process temperature between 300° and 700° C. and an energy input from the plasma below 5% of the process heat input. The energy to achieve the required process temperature is supplied by preheating of the reactants or heat exchange within the reactor, for example, through heat recovery from the reaction products, addition of small amounts of oxygen, utilization of waste heat from the plant, etc.

The PAR process in accordance with one embodiment of this invention (FIG. 4) builds upon recent advances in non-thermal plasmas and catalytic processes of coal gasification to gasify coal with steam at low temperatures to produce clean product gas that is free of tars and oils. In the PAR process in accordance with one preferred embodiment of this invention, coal is ground in a micronizer mill to the desired average particle size of less than or equal to about 20 micrometers using superheated steam and fed into a low-temperature plasma, preferably Dielectric Barrier Discharge (DBD), reactor. In the DBD plasma reactor, coal is converted at low temperature (300° C. to 700° C.) into product gas comprising up to 60% $H_2$, 30% $CO_2$ and char. Particulate matter and contaminants such as sulfur, halides and mercury which may be present in the product gas are removed from the product gas under warm gas conditions. The cleaned product gas, rich in hydrogen and carbon dioxide, is purified and separated into high purity hydrogen and sequestration-ready carbon dioxide. The remaining char may be recirculated back into the PAR plasma reactor or fed into a bottoming cycle for electricity generation and steam production. The PAR process module utilizes electricity produced in the bottoming cycle or from elsewhere in amounts up to 5% of the coal heat input and utilizes low-grade indirect heat at about 600° C. for sustaining the process temperature at the required levels.

Figure 4:
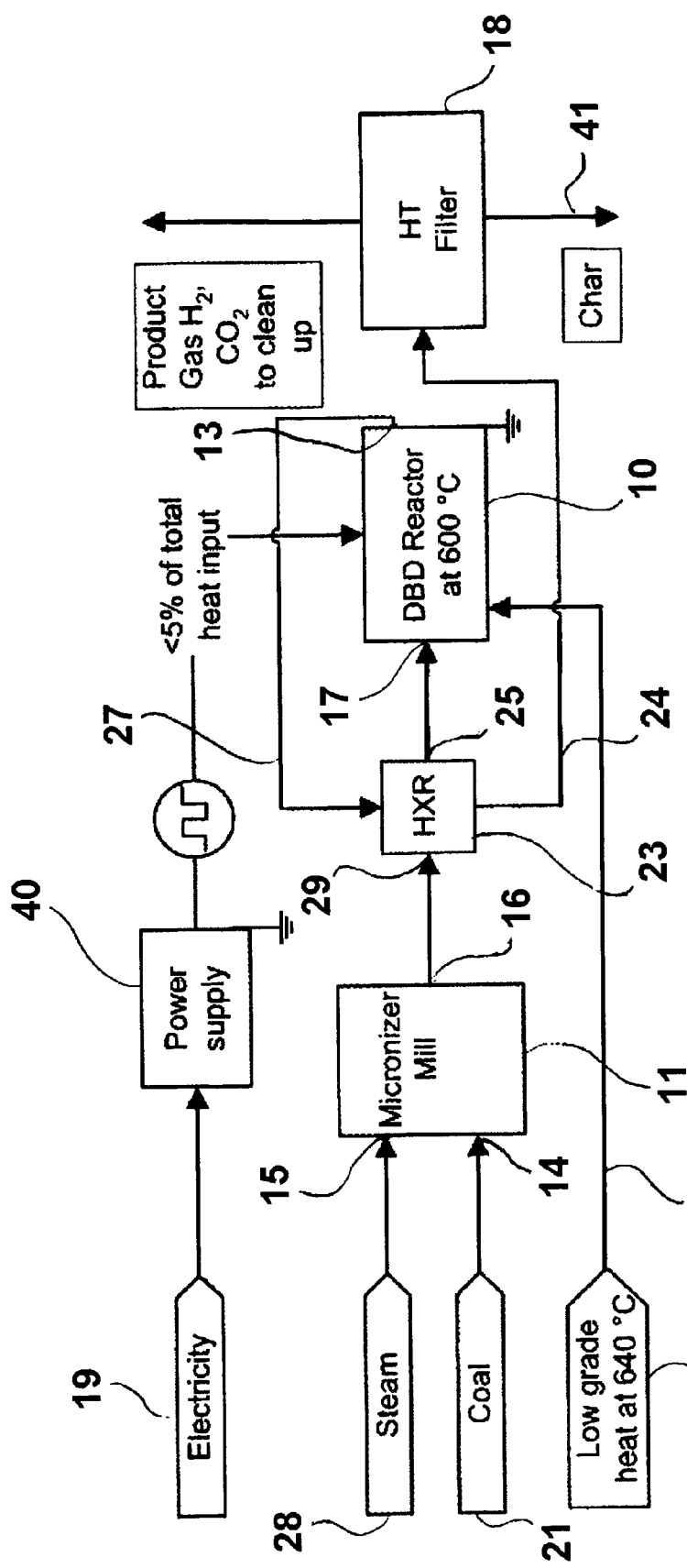
FIG. 4 is a schematic diagram of a plasma assisted reforming process module in accordance with one embodiment of the system of this invention.

FIG. 4 is a schematic diagram showing a PAR process module in accordance with one embodiment of this invention. As shown therein, the module comprises a DBD plasma reactor 10 having a reactants inlet 17 and a product gas outlet 13, a micronizer mill 11 having a steam inlet 15 in fluid communication with a steam source 28, a coal inlet 14 in fluid communication with a coal supply 21, and a steam/coal mixture outlet 16, and a heat exchanger 23 having a steam/coal mixture inlet 29 in fluid communication with the steam/coal mixture outlet 16 of micronizer mill 11 and having a preheated steam/coal mixture outlet 25 in fluid communication with reactants inlet 17 of DBD reactor 10. Power comprising less than about 5% of the total heat input to DBD reactor 10 is provided by power supply 40 operably connected with electricity source 19 and DBD reactor 10. Heat is provided by heat source 20 through heat supply line 22 to DBD reactor 10.

In accordance with one embodiment of this invention, product gas outlet 13 of DBD plasma reactor 10 is in fluid communication by means of product gas line 27 with heat exchanger 23 whereby product gas from DBD plasma reactor 10 is in heat exchange relation with the steam/coal mixture entering heat exchanger 23 through steam/coal mixture inlet 29, thereby preheating the steam/coal mixture prior to its introduction into DBD plasma reactor 10. Cooled product gas from heat exchanger 23 is transported by way of product gas line 24 to a high temperature filter 18 in which solids, such as char, present in the product gas are separated out of the product gas stream through char feed line 41 and the remaining components of the product gas stream are transported to a gas clean-up process.

Table 1 provides an analysis of Illinois coal employed for evaluation of the PAR process module of this invention.

The $H_2$ output per pound of coal is higher in the PAR process of this invention than in traditional gasification. In traditional gasification, one (1) mole of carbon produces one mole of $H_2$ in two-steps:

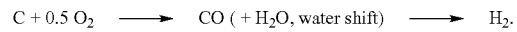

$$C + 0.5\,O_2 \longrightarrow CO\ (+ H_2O, \text{water shift}) \longrightarrow H_2.$$

In the PAR process of this invention, one (1) mole of carbon produces two moles of $H_2$ in one step:

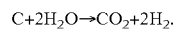

$$C + 2H_2O \rightarrow CO_2 + 2H_2.$$

The PAR process in accordance with one embodiment of this invention can also be conducted by partially or completely replacing steam with other oxygen carriers such as $CO_2$. In this case, the PAR product gas will consist mostly of CO and smaller amounts of $H_2$. The PAR process in accordance with one embodiment of this invention also can be conducted with small additions of $O_2$ (or air), which can provide additional process initiation and an additional process temperature control mechanism.

In the PAR process of this invention, coal as a feedstock can be replaced with renewable fuel solid feedstock, including solid biomass, farm discards, wood waste, bark, sawdust, etc. The PAR process in accordance with one embodiment of this invention can be conducted by the addition of hydrogen carrier molecules such as hydrocarbons. The PAR process of this invention can be used to produce hydrocarbons and syngas.

Figure 5:
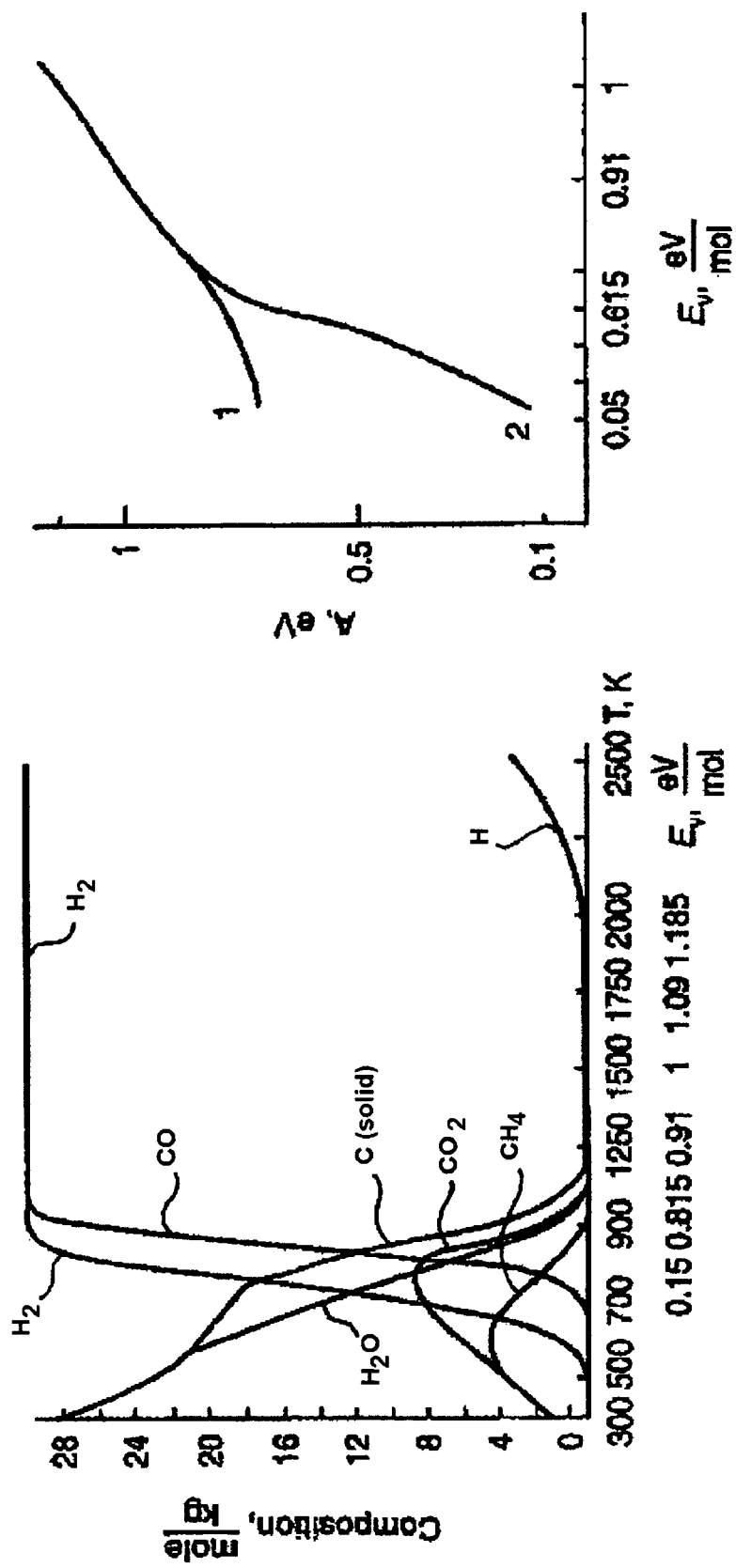
FIG. 5($a$) is a diagram showing the equilibrium composition of a $C_{(S)}$—$H_2O$ mixture as a function of temperature.

The results of the thermodynamic analysis of a C(solid)-$H_2O$ mixture, shown in FIG. 5(*a*), show a thermodynamically favorable range of about 500°-800° C. for $H_2$ production. These process temperatures drastically reduce energy con-

TABLE 1

Analysis of Illinois Coal used for PAR Module Evaluation

| Proximate Analysis (Weight %) | Moisture | Ash | Volatile Materials | Sulfur | Fixed Carbon (BD) | HHV (kJ/kg) | HHV (Btu/lb.) | LHV (kJ/kg) | LHV (Btu/lb.) |
|---|---|---|---|---|---|---|---|---|---|
| As Received | 0.0797 | 0.1425 | 0.3686 | 0.0045 | 0.4047 | 25,2584 | 10,999 | 24,528 | 10,545 |
| Dry | 0 | 0.1548 | 0.4005 | 0.0049 | 0.4397 | 27,799 | 11,952 | 24,528 | 10,545 |
| Ultimate Analysis | Moisture | Carbon | Hydrogen | Nitrogen | Chlorine | Sulfur | Ash | Oxygen (BD) | |
| As Received | 0.0797 | 0.6042 | 0.0389 | 0.0107 | 0.0005 | 0.0445 | 0.1425 | 0.0791 | |
| Dry | 0 | 0.6565 | 0.0423 | 0.0116 | 0.0005 | 0.0483 | 0.1548 | 0.0860 | |

Coal Origin:
Rank - High-volatility
Seam - Illinois #6 (Herrin)
Sample Location - St. Clair County, Illinois The PAR reaction for 1 kg of Illinois coal with composition shown in Table 1 is as follows:

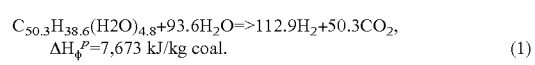

$$C_{50.3}H_{38.6}(H2O)_{4.8} + 93.6H_2O \Rightarrow 112.9H_2 + 50.3CO_2,$$
$$\Delta H_\phi^P = 7{,}673 \text{ kJ/kg coal.} \quad (1)$$

This reaction is endothermic, with a reaction enthalpy of about 7,673 kJ/kg coal. It produces about 112.9 moles of hydrogen (0.228 kg) per kg of coal. The reaction, in contrast to regular gasification reactions, increases the HHV of the fuel at the exit of the DBD plasma reactor by using low-grade heat at 600° C. As shown in Table 1, the HHV of Illinois coal (as received) is about 25,584 kJ/kg (10,999 Btu/lb), and the HHV of the produced hydrogen in the above reaction (1) is about 32,354 kJ/kg coal (13,910 Btu/lb coal).

sumption as compared to high-temperature gasification. Energy costs (i.e. consumption) for the PAR process are as low as 0.1 eV/molecule (>110 kJ/mole syngas) at process energy inputs of 5 to 10 kJ/mole and temperatures of about 500°-600° C. (incomplete conversion). Energy costs (FIG. 5(*b*)) increase to 0.7 to 0.9 eV/molecule (70 to 90 kJ/mole syngas) for complete conversion, comparable with catalytic steam reforming of natural gas to syngas.

Figure 6:
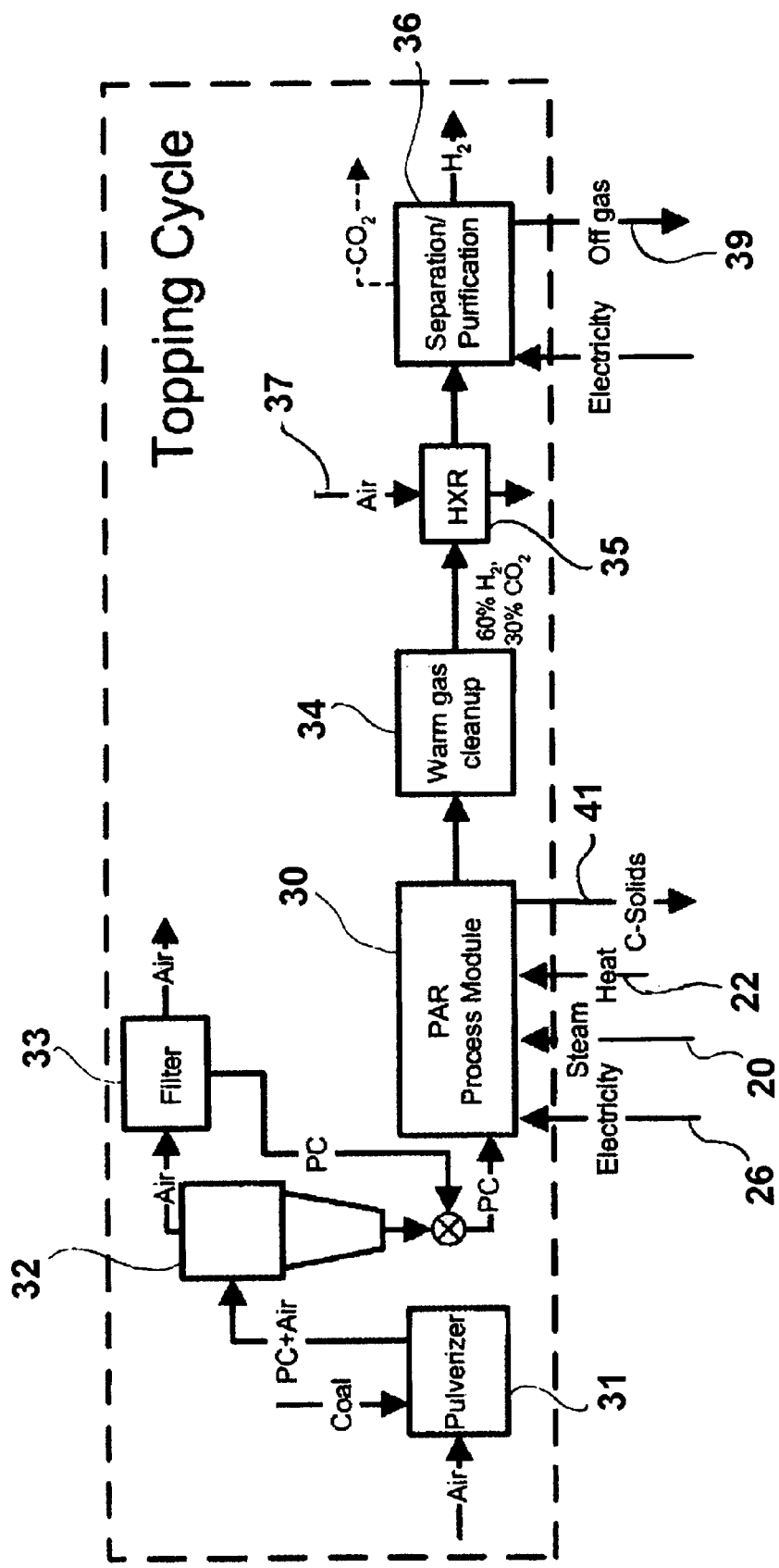
FIG. 6 is a schematic diagram showing a topping cycle for a two-stage DBD-assisted plant for co-production of hydrogen and electricity in accordance with one embodiment of the system of this invention.

In accordance with one embodiment of this invention, a topping cycle as shown in FIG. 6 is installed upstream of an advanced electricity production plant (bottoming cycle). In one of the preferred embodiments of this invention as previously indicated, the PAR process module 30 converts, at low temperature (300° to 700° C.), coal into 80% product gas comprising up to 60% by weight. $H_2$ and 30% by weight $CO_2$ and 20% by weight char. The product gas is fed into a warm gas clean up unit 34 for removal of sulfur, mercury and other gaseous impurities and then into a purification unit 36 for hydrogen separation and $CO_2$ capture. The remaining char and off-gas are fed by means of lines 41 and 39, respectively, into a bottoming cycle for electricity and steam production. Alternatively, the remaining char can be recirculated back into the PAR process module 30, while required steam and electricity is supplied from elsewhere.

In the topping cycle shown in FIG. 6, steam, electricity and heat at about 640° C. may be supplied through lines 20, 26 and 22, respectively, from a bottoming cycle. Product gas is provided to heat exchanger 35 and warm gas clean up system 34. Thereafter, the product gas, comprising mostly hydrogen and $CO_2$, is input into hydrogen purification system 36. At this stage, a $CO_2$ capture unit may be installed.

A hydrogen purification unit such as a pressure-swing adsorption (PSA) based unit may be used to separate hydrogen at the required purity.

In accordance with one embodiment of this invention, the topping cycle includes a solids pretreatment section disposed upstream of PAR process module 30, in which pretreatment section the solids are pulverized with air in a pulverizer 31. The pulverized solids and air are transported to cyclone 32 in which the particles of pulverized solids and air are separated. The pulverized solids are then introduced into the PAR process module 30 in which the solid particles preferably undergo micronization as before and the micronized particles are then introduced into the PAR plasma reactor. Air from the cyclone is passed through filter system 33 disposed downstream of cyclone 32 for separation of any remaining pulverized solid particles, which are also introduced into the micronizer. As will be discussed in more detail herein below, the PAR process of this invention may be modified, in accordance with one embodiment of this invention, to accommodate larger carbonaceous material particle sizes, thereby enabling a reduction or altogether elimination of the micronization step.

Figure 7:
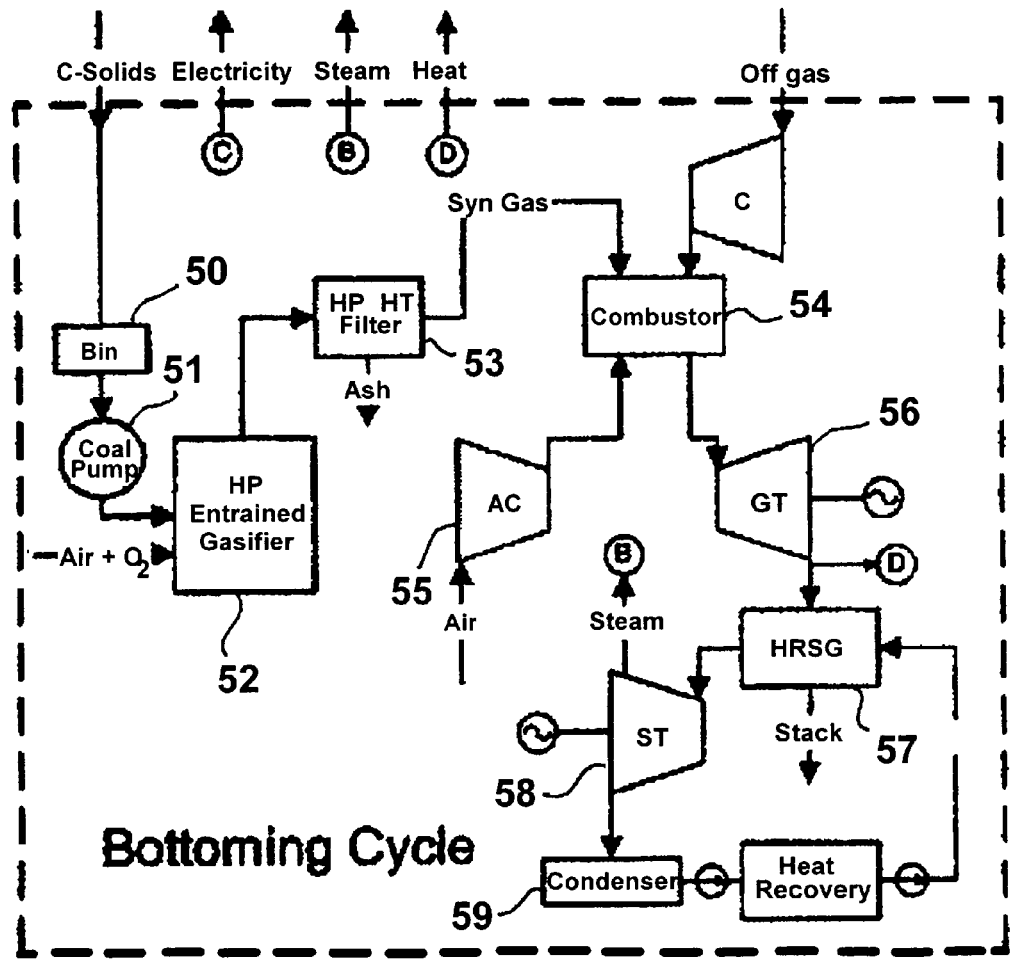
FIG. 7 is a schematic diagram showing a bottoming cycle with entrained flow gasifier for a two-stage plant for co-production of hydrogen and electricity in accordance with one embodiment of the system of this invention.
Figure 8:
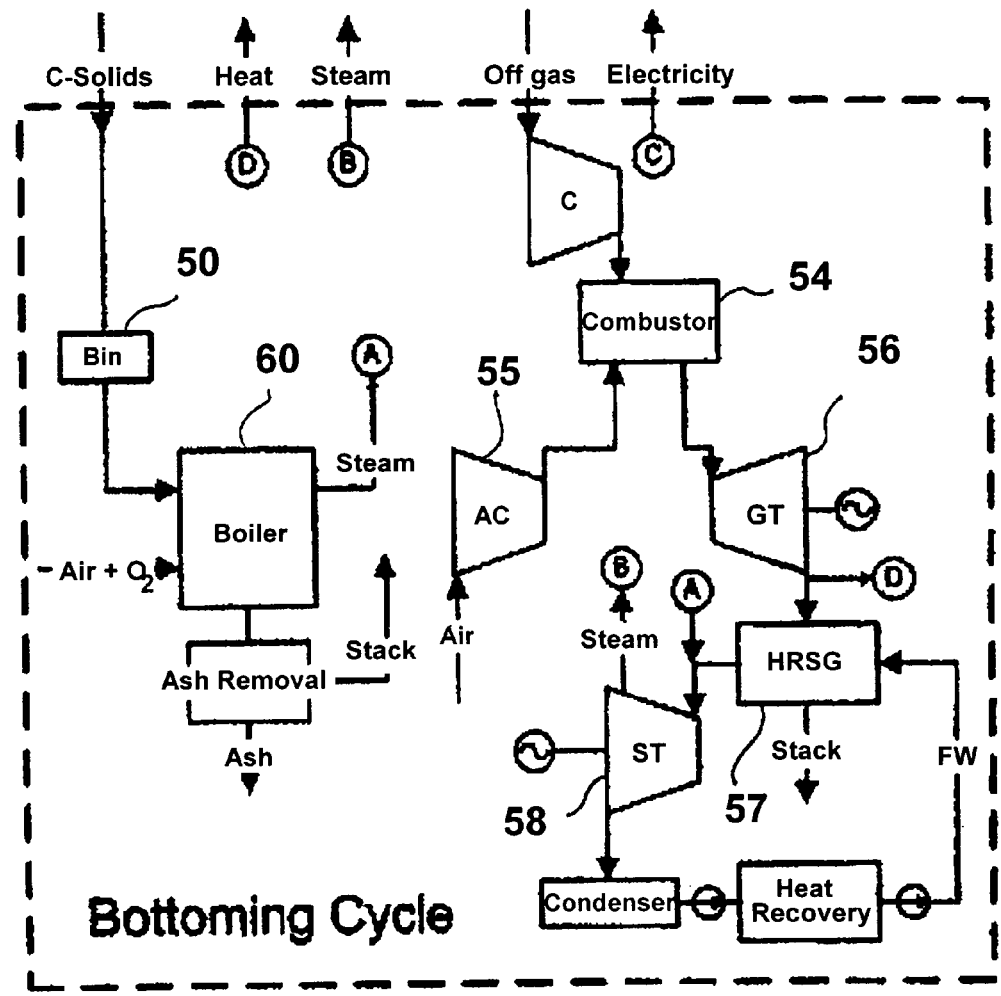
FIG. 8 is a schematic diagram showing a bottoming cycle with a boiler for a two-stage plant for co-production of hydrogen and electricity in accordance with one embodiment of the system of this invention.

The PAR process module, shown in FIG. 6 in combination with a topping cycle, can be combined with a bottoming cycle. The bottoming cycle can be gasifier-based, as shown in FIG. 7, or boiler-based as shown in FIG. 8. In the bottoming cycle, char and off-gas from the topping cycle can be burned to produce steam and electricity, a small portion of which is returned to the topping cycle. In the gasifier-based bottoming cycle shown in FIG. 7, the char from the topping cycle is introduced into storage bin 50 from which it is pumped by means of coal pump 51 into high pressure entrained gasifier 52 into which air and oxygen are also introduced. The synthesis gas produced in gasifier 52 is passed through high temperature, high pressure filter 53 for removal of ash, after which the synthesis gas is introduced into combustor 54 together with compressed air from compressor 55 and off-gas from the topping cycle. The combustor exhaust gases are introduced into gas turbine 56 for generation of electricity. Heat from gas turbine 56 is used in the PAR process module. A portion of the exhaust gases are introduced into heat recovery steam generator 57 in which steam for use in the PAR process module is generated. The steam from heat recovery steam generator 57 is introduced into steam turbine 58, generating electricity and compressed steam. A portion of the compressed steam is introduced into condenser 59, producing water, which is then recycled into heat recovery steam generator 57. The remaining portion of steam is conveyed to the PAR process module for use therein.

In the boiler bottoming cycle shown in FIG. 8, rather than being introduced into a gasifier as shown in FIG. 7, the char is introduced, together with air and oxygen, into boiler 60 in which steam is generated. The steam generated by boiler 60 is combined with the steam output from heat recovery steam generator 57 for subsequent compression and conveyance to PAR process module 30.

Figure 9:
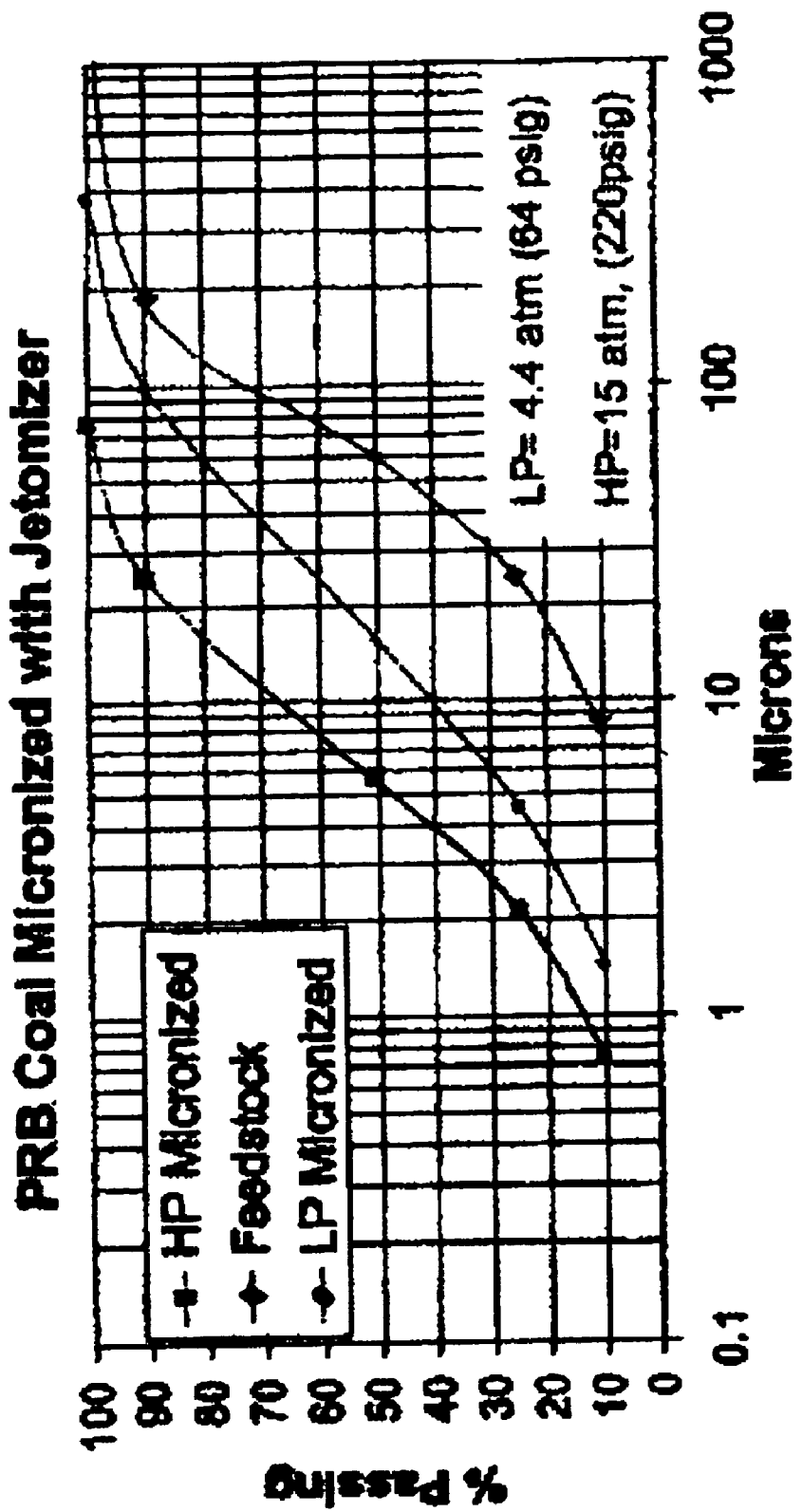
FIG. 9 is a diagram showing the size distribution for steam-based micronization of PRB coal.

In accordance with one embodiment of this invention, pulverized PRB coal is micronized with superheated steam in the micronizer mill. A high-pressure (HP) steam jet is used to induce particle-to-particle and particle-to-wall impacts within the grinding chamber. Size distribution for produced micronized coal, shown in FIG. 9, shows that 100% of the coal is micronized to below 75 microns, and 65% (by mass) is micronized to below 10 microns using 15 atm superheated steam. The coal/steam mixture is fed into the DBD plasma reactor. Residence time of the reactants within the DBD plasma reactor is about 1 sec., and the process temperature, $T_p$, is about 600° C. The PAR process was conducted at a controlled reactor temperature of about 600° C. with variable coal particle size and without plasma. After completing the test without plasma, the DBD plasma was turned on at the same operating conditions and the process was conducted with plasma.

Figure 10:
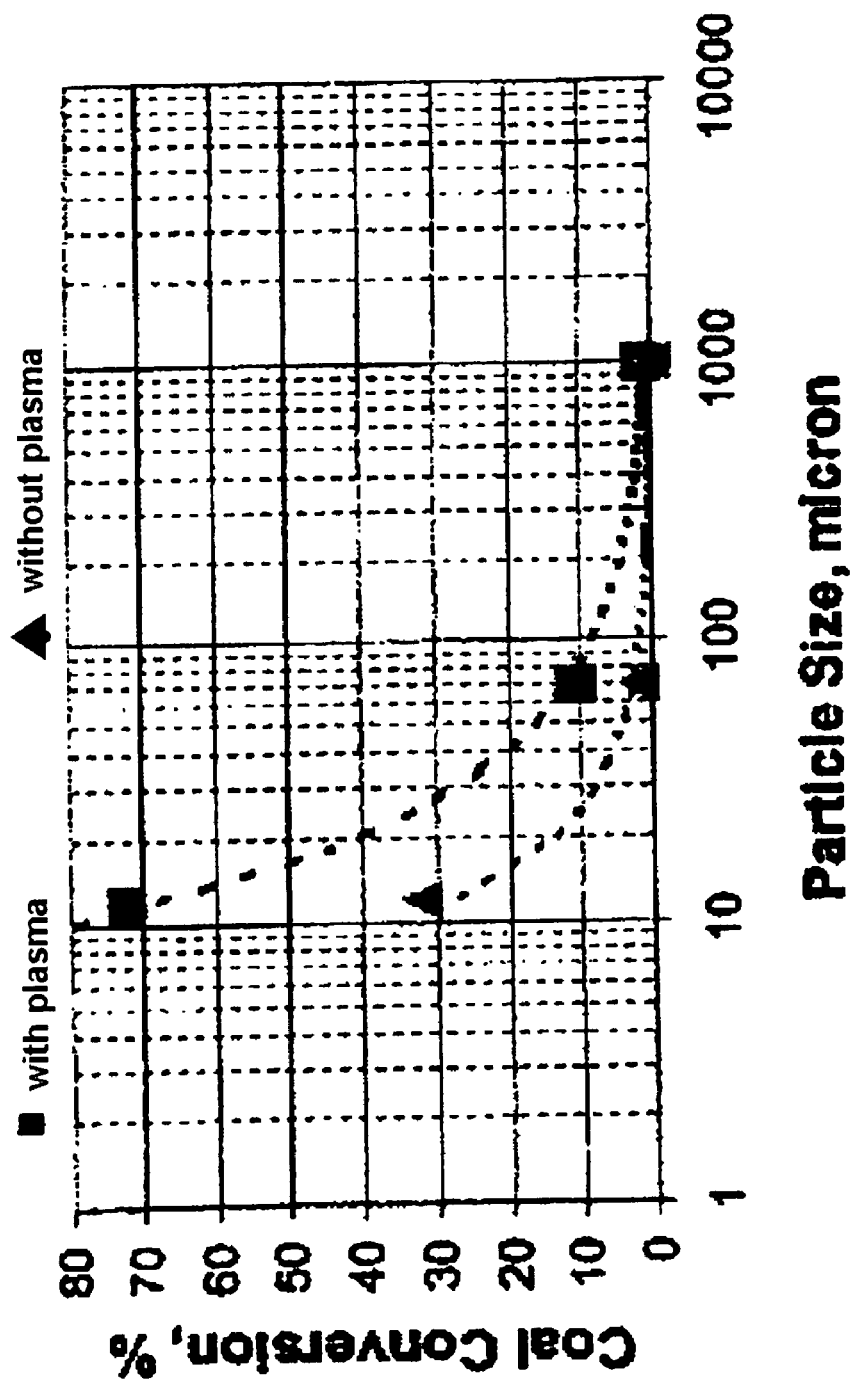
FIG. 10 is a diagram showing PRB coal conversion as a function of particle size with and without plasma.

FIG. 10 shows the results of the coal conversion tests for different sizes of coal particles with and without DBD plasma. The two plots show the degree of coal conversion, with both micronization and plasma contributing to the process. The DBD plasma also destroys oils and tars in the presence of steam. Composition of the product gas was 59% by volume $H_2$, 32% by volume $CO_2$, 4.4% by volume $CO$, 3% by volume $CH_4$, and less than about 2% other. The steam-to-coal ratio was greater than about 1.5.

In accordance with one embodiment of this invention, the PAR process is conducted in non-thermal DBD plasma in steam at temperatures of about 500° C. to 720° C., in a fixed bed reactor, with PRB coal, lignite and char. Solid fuel is placed in an externally heated reactor and exposed to DBD plasma. Steam at about 500° C.-610° C. is fed at a continuous mass flow rate. Table 2 provides PRB and lignite coals laboratory analysis results. Table 3 shows the product gas composition and reaction temperatures. The dominant reaction products are $H_2$ and $CO_2$ with trace amounts of $C_2$ and higher hydrocarbons. The reaction temperature is lower for the more reactive PRB and lignite than for char.

TABLE 2

| Analysis Parameters | Lignite | PRB |
|---|---|---|
| Proximate Analysis (as received) | | |
| Moisture, % | 18.6 | 11.0 |
| Volatile Matter, % | 35.5 | 37.2 |
| Ash (750° C.) | 11.5 | 5.8 |
| Fixed Carbon, % | 34.4 | 46.1 |
| Ultimate Analysis (Dry Basis) | | |
| Hydrogen, % | 12.6 | 6.48 |
| Carbon, % | 60.4 | 71.76 |
| Nitrogen, % | 3.9 | 5.22 |
| Sulfur, % | 0.9 | 1.06 |
| Oxygen, % | 0.9 | 0.24 |
| Heating Value (Dry Basis) | | |
| BTU/lb. | 10,200 | 11,980 |

TABLE 3

| Solid Fuel | Temperature of Reaction, °C. | Product Gas Composition, dry mole % | | | | |
|---|---|---|---|---|---|---|
| | | $H_2$ | $CO_2$ | CO | $CH_4$ | Other |
| Coal Char | 720 | 60 | 21 | 19 | <0.1 | <0.1 |
| PRB Coal | 595 | 58.5 | 32.3 | 4.4 | 2.7 | <2 |
| Lignite | 460 | 54.1 | 33.7 | 4.1 | 2.4 | <5 |

As previously indicated, the preferred particle size for the carbonaceous material to be converted into syngas in the plasma assisted reforming process of this invention is an average of about 20 microns or less. The smaller the particle size is, the greater is the amount of active carbonaceous material surface area available for reaction in the PAR process. As the particle sizes of the carbonaceous material increase, the carbonaceous material conversion efficiency decreases for a given particle residence time within the plasma assisted reforming reactor, leaving partially reacted carbonaceous material particles in the synthesis gas. The issue of larger carbonaceous material particles sizes can be addressed in accordance with one embodiment of this invention by conducting the carbonaceous material conversion in two or more plasma assisted reforming stages.

Figure 11:
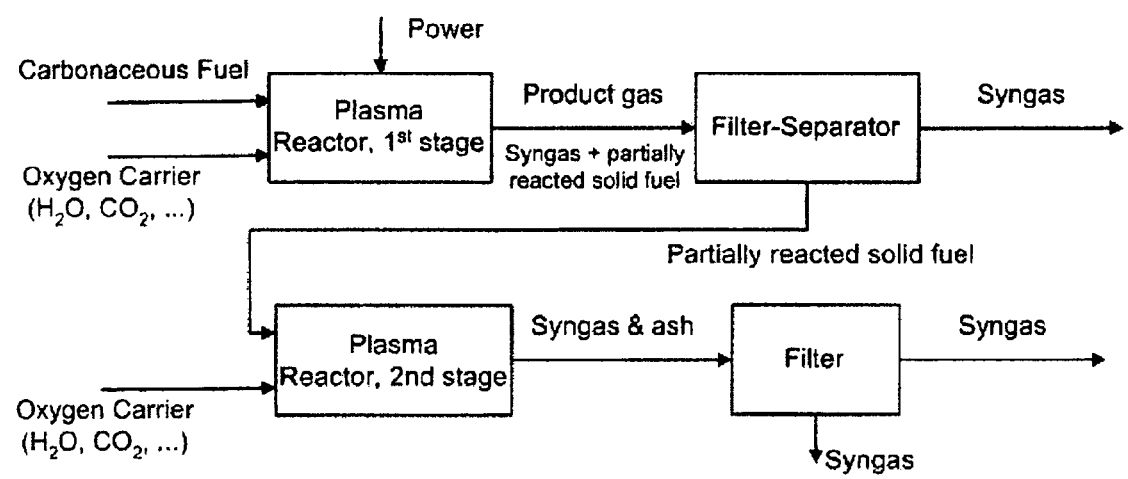
FIG. 11 is a schematic diagram showing a staged process for plasma assisted reforming of carbonaceous fuel in accordance with one embodiment of this invention.

FIG. 11 shows a staged process for plasma assisted reforming of carbonaceous fuel in accordance with one embodiment of this invention in which the carbonaceous material to be converted and an oxygen carrier are introduced into a first stage plasma assisted reactor, resulting in the formation of a mixture of synthesis gas and partially reacted carbonaceous material particles. The mixture is introduced into a filter separator unit in which the partially reacted carbonaceous material particles are separated from the synthesis gas. The separated partially reacted carbonaceous material particles are then introduced into a second stage plasma assisted reactor in which conversion of the partially reacted carbonaceous material particles to synthesis gas is completed, forming a mixture of synthesis gas and ash, which mixture is introduced into a filter unit for removal of the ash from the synthesis gas.

Figure 12:
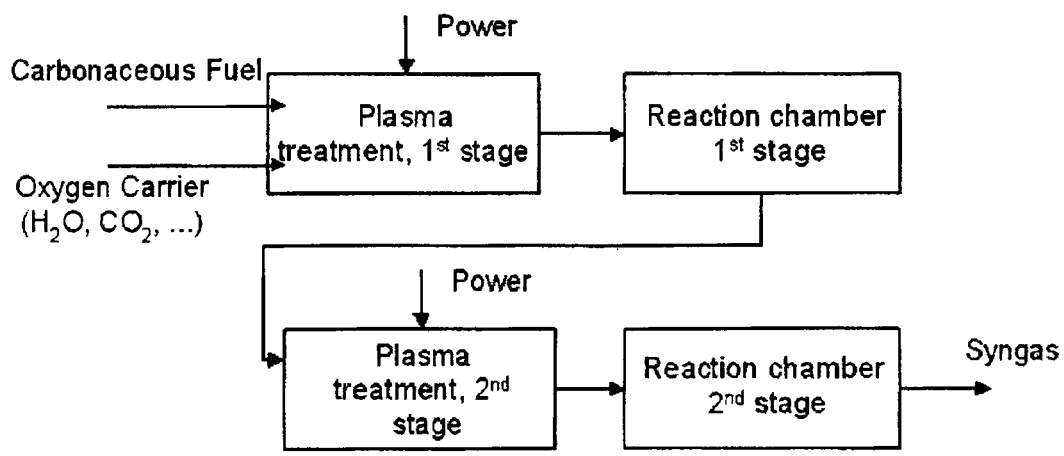
FIG. 12 is a schematic diagram showing a staged process for plasma assisted reforming of carbonaceous fuel in accordance with another embodiment of this invention.

It will be appreciated by those skilled in the art that one of the parameters for complete conversion of the carbonaceous material particles is the residence time of the reactants within the plasma assisted reactor. Thus, as the particle sizes of the carbonaceous material to be converted increase, the residence time of the reactants within the plasma assisted reactor required to obtain substantially complete conversion of the particles to synthesis gas also increases. In accordance with one embodiment of this invention as shown in FIG. 12, the plasma assisted reforming process is conducted with at least two stages of plasma treatment separated by a post plasma reaction stage in which the conversion of the plasma activated particles from the first plasma treatment stage is completed. In accordance with one embodiment of this invention, each plasma treatment stage is followed by a post plasma reaction stage. It will be apparent to those skilled in the art that each of the stages of the plasma assisted reforming process may be carried out in a single reaction vessel having a zone for each of the stages, or each of the stages may be carried out in individual reaction vessels, and both such arrangements are deemed to be within the scope of this invention. In this manner, the time period, i.e. reactants residence time, for complete conversion of the carbonaceous material particles can be varied to accommodate the various operating parameters including type of carbonaceous material, particle size, temperature, pressure, and reactant flow rate. In accordance with one preferred embodiment of this invention, the residence time of the reactants in the post plasma reaction stage is in the range of about 1 second to about 60 seconds.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

We claim:

1. A method for producing synthesis gas comprising the steps of:
   introducing a solid carbonaceous material and at least one oxygen carrier into a non-thermal plasma reactor at a temperature in a range of about 300° C. to about 700° C.;
   generating a non-thermal plasma discharge within said non-thermal plasma reactor, forming a plasma reaction zone;
   exposing said solid carbonaceous material and said at least one oxygen carrier to said non-thermal plasma discharge in said plasma reaction zone, forming a product gas comprising at least one of a synthesis gas and at least one hydrocarbon, and char in said non-thermal plasma reactor; and
   using said char in a bottoming cycle.

2. A method in accordance with claim 1, wherein said at least one oxygen carrier comprises steam.

3. A method in accordance with claim 1, wherein said non-thermal plasma discharge is generated by one of a dielectric barrier discharge, a corona discharge and an electron beam.

4. A method in accordance with claim 1, wherein said solid carbonaceous material and said at least one oxygen carrier are preheated to a preheat temperature of at least about 300° C.

5. A method in accordance with claim 1, wherein said solid carbonaceous material is introduced with said at least one oxygen carrier into a micronizer prior to being introduced into said non-thermal plasma reactor, producing a micronized carbonaceous material having an average particle size of one of less than and equal to about 20 microns.

6. A method in accordance with claim 5, wherein said micronized carbonaceous material and said at least one oxygen carrier are preheated to at least about 300° C.

7. A method in accordance with claim 1, wherein said solid carbonaceous material is selected from the group consisting of fossil fuels, carbonaceous fuels, renewal energy sources, carbonaceous wastes and combinations thereof.

8. A method in accordance with claim 5, wherein said solid carbonaceous material is micronized with steam in said micronizer.

9. A method in accordance with claim 4, wherein a portion of said synthesis gas is introduced into a heat exchanger whereby heat is transferred from said synthesis gas to preheat said solid carbonaceous material and said oxygen carrier.

10. A method in accordance with claim 1, wherein at least a portion of said synthesis gas is utilized for generation of electricity in a topping cycle.

11. A method in accordance with claim 1, wherein said exposing of said solid carbonaceous material and said at least one oxygen carrier to said non-thermal plasma discharge results in formation of a plurality of partially reacted carbonaceous material particles.

12. A method in accordance with claim 11, wherein said plurality of partially reacted carbonaceous material particles is introduced into a post plasma reaction zone disposed downstream of said plasma reaction zone resulting in a reduced amount of said partially reacted carbonaceous material particles.

13. A method in accordance with claim 12, wherein said reduced amount of said partially reacted carbonaceous material particles is introduced with an additional amount of said at least one oxygen carrier into a second plasma reaction zone disposed downstream of said post plasma reaction zone resulting in a further reduced amount of said partially reacted carbonaceous material particles.

14. A method in accordance with claim 1, wherein pressure within said non-thermal plasma reactor is in a range from about atmospheric to about 70 atm.

* * * * *